US007493214B2

(12) United States Patent
Jung et al.

(10) Patent No.: US 7,493,214 B2
(45) Date of Patent: Feb. 17, 2009

(54) TRAVEL ROUTE SEARCHING METHOD OF MOBILE OBJECT

(75) Inventors: Mun Ho Jung, Gyeonggi-do (KR); Dong Hoon Yi, Seoul (KR); Hee Youn Lee, Seoul (KR); Jeong Soo Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 482 days.

(21) Appl. No.: 11/234,632

(22) Filed: Sep. 22, 2005

(65) Prior Publication Data

US 2006/0069501 A1 Mar. 30, 2006

(30) Foreign Application Priority Data

Sep. 24, 2004 (KR) ...................... 10-2004-0077311
Oct. 20, 2004 (KR) ...................... 10-2004-0084133
Nov. 4, 2004 (KR) ...................... 10-2004-0089184

(51) Int. Cl.
*G01C 21/34* (2006.01)
*G01C 21/26* (2006.01)

(52) U.S. Cl. .................... 701/209; 701/213; 340/995.19

(58) Field of Classification Search ....................... None
See application file for complete search history.

(56) References Cited

U.S. PATENT DOCUMENTS 5,684,704 A * 11/1997 Okazaki ..................... 701/208
5,832,406 A * 11/1998 Iwami et al. ................ 701/202
5,878,368 A * 3/1999 DeGraaf ..................... 701/209
5,905,451 A * 5/1999 Sakashita .................... 340/988
6,049,753 A * 4/2000 Nimura ...................... 701/201
6,098,015 A * 8/2000 Nimura et al. .............. 701/209
6,212,473 B1 * 4/2001 Stefan et al. ................ 701/210
6,256,579 B1 * 7/2001 Tanimoto .................... 701/201
6,269,303 B1 * 7/2001 Watanabe et al. ........... 701/209
6,362,751 B1 * 3/2002 Upparapalli ........... 340/995.19
6,456,932 B2 * 9/2002 Yagyu ........................ 701/209

(Continued)

FOREIGN PATENT DOCUMENTS

JP 08-201088 * 8/1996

(Continued)

*Primary Examiner*—Michael J. Zanelli
(74) *Attorney, Agent, or Firm*—Lee, Hong, Degerman, Kang & Waimey

(57) ABSTRACT

A travel route searching method of a mobile object whereby a travel route preferred by a user of a mobile object is searched using a road preferred by the user of the mobile object, a travel pattern at a crossroad and a road recommended by other user, and wherein the method comprises the steps of: collecting information of a road traveled by the mobile object, and discriminating a road preference by the collected information of the road to search the travel route; collecting a behavioral factor of the mobile object at a crossroad, and discriminating a behavioral factor preference of the user by the collected behavioral factor to search the travel route; storing as a recommended road the information of the road the mobile object has traveled if there is a instruction of storing the recommended road; and searching a recommended road situated between a starting point and a destination if the travel route is searched. Preference of the user relative to roads, a travel pattern preferred by the user and a recommended route are selectively used for the search of the travel route by the user.

35 Claims, 12 Drawing Sheets

U.S. PATENT DOCUMENTS

| | | | | |
|---|---|---|---|---|
| 6,622,087 | B2 * | 9/2003 | Anderson | 701/209 |
| 6,859,724 | B2 * | 2/2005 | Komatsu | 701/202 |
| 2002/0128773 | A1 * | 9/2002 | Chowanic et al. | 701/210 |
| 2004/0015291 | A1 * | 1/2004 | Petzold et al. | 701/202 |
| 2004/0102899 | A1 * | 5/2004 | Kaji et al. | 701/210 |
| 2004/0148095 | A1 * | 7/2004 | Katou | 701/201 |

FOREIGN PATENT DOCUMENTS

| | | | |
|---|---|---|---|
| JP | 09-292251 | * | 11/1997 |
| JP | 2003-121186 | * | 4/2003 |
| WO | WO 99/14701 | * | 3/1999 |

* cited by examiner

FIG. 5

| TRAVEL DATE | U TURN | RIGHT TURN | GO STRAIGHT | LEFT TURN |
|---|---|---|---|---|
| 2004-7-8 12:00~<br>2004-7-8 13:10 | 0 | 2 | 2 | 3 |
| 2004-8-1 9:00~<br>2004-8-18 15:10 | 1 | 3 (1X2)<br>+ (1X1) | 1 (1X2)<br>5 + (1X2)<br>+ (1X1) | 8 |
| 2004-9-1 9:00~<br>2004-9-18 15:10 | 0 | 1 | 3 | (1X2)<br>5 + (1X2)<br>+ (1X1) |
| 계 | 1 | 6 | 10 | 16 |

FIG. 6

| CLASSIFICATION | BEHAVIORAL FACTOR |
|---|---|
| CROSSROAD | RIGHT TURN/LEFT TURN/<br>GO STRAIGHT · · · |
| KIND OF ROAD | HIGHWAY/STATE ROAD · · · |
| ⋮ | ⋮ |

TRAVEL ROUTE SEARCHING METHOD OF MOBILE OBJECT

CROSS REFERENCE TO RELATED APPLICATIONS

Pursuant to 35 U.S.C. § 119(a), this application claims the benefit of earlier filing date and right of priority to Korean Patent Application Nos. 10-2004-0077311, 10-2004-0084133 and 10-2004-0089184 filed on Sep. 24, 2004, Oct. 20, 2004 and Nov. 4, 2004 respectively, the contents of which are hereby incorporated by reference herein in their entirety.

BACKGROUND OF THE INVENTION

1. Field of the Invention

The present invention relates to a travel route searching method of a mobile object in a navigation system from a current position to a destination. More particularly, the present invention relates to a travel route searching method of a mobile object using a road preferred by a user of the mobile object, a travel pattern at a crossroad and a road recommended by other users.

2. Description of the Related Art

As the number of various vehicles such as passenger cars continuously increases, traffic congestion becomes more critical. Particularly, there is a serious problem in that the increase rate in the number of vehicles is much faster than that of infrastructure such as road, bridge or the like. As one of the solutions to such traffic congestion, attention has been paid to a navigation system for guiding a travel path of a vehicle using a navigation system known as Global Positioning System (GPS).

In a navigation system using the GPS, a GPS receiver receives navigation messages transmitted by a plurality of GPS satellites in order to detect a location at which the navigation messages are received, i.e., a current vehicle location, using the received navigation messages, and the detected current vehicle location is map-matched on a digital map data so that the digital map data and the current vehicle location can be displayed on a display screen.

Therefore, the vehicle user can beforehand search or plan a travel route from the current vehicle location to a destination and under the guidance of the navigation system, the vehicle user can move a vehicle along the searched travel route. Accordingly, when the navigation system is used, the travel route of the vehicle can be searched and guided, resulting in an efficient use of the given road systems.

In the conventional navigation system by which a search is made for a travel route from a current location of a vehicle to a destination, a shortest route is searched using the map date stored in a map data storage, or a travel route is searched using a preference search of a highway or a freeway.

The navigation system is used for receiving traffic information via a public communication network, and the received traffic information is further used to search a travel route of a mobile object, enabling to avoid a congested road.

However, the conventional method thus mentioned has been to search a travel route of a vehicle without reflecting information of a road preferred by a vehicle user, a travel pattern and the like. Therefore, there is a limit in searching for an optimum travel route specifically wanted by a vehicle user.

In other words, there are cases where, in moving a mobile object from a current location to a destination, a vehicle user wants to travel to a destination along a scenic road instead of using a broad road. Furthermore, there is a travel pattern preferred by a vehicle user such as a U-turn, a straight run, a right turn or a left turn at every crossroad.

The travel route of a vehicle user has been searched in the past without consideration to a travel preference of the vehicle user for each road from a current location of a vehicle to a destination and a travel pattern at each crossroad. Accordingly, there is a limit in searching an optimum travel route for a vehicle user, resulting sometimes in a case where a searched travel route in a navigation system is avoided by the vehicle user who then travels along another travel route.

There is a case where a vehicle is used by plural users, and in this case, other users may recommend a scenic route or a route where it is convenient to steer a vehicle and traffic is less congested. However, there is a problem in the conventional navigation system thus explained in that a travel route has been searched without any consideration to the other users' recommendation.

SUMMARY OF THE INVENTION

The present invention is disclosed to solve the aforementioned problems and it is an object of the present invention to provide a travel route searching method of a mobile object adapted to discriminate a preference of a vehicle user for each road located from a starting point of a mobile object to a destination and to search a travel route of the mobile object using the discriminated preference.

It is another object of the present invention to provide a travel route searching method of a mobile object adapted to collect a preferred travel pattern of a vehicle user at each crossroad and to search a travel route of a mobile object using the collected travel pattern.

It is still another object of the present invention to provide a travel route searching method of a mobile object adapted to reflect a travel route recommended by other users and to search a travel route of a mobile object thereby.

The travel route searching method of a mobile object according to the present invention comprises the steps of: a controller reading out from a memory all the prior travel route information from a starting point to a destination; discriminating a frequency in which the mobile object has traveled relative to each road situated from the starting point to the destination and providing a weight factor to each road relative to the discriminated frequency; and searching a travel route of the mobile object from the starting point to the destination in response to the weight factor provided.

The reading out of the prior travel route information is implemented following input of the starting point and the destination of the mobile object if a search instruction of the travel route is inputted.

The starting point is a location detected by navigational messages received by a GPS receiver and a current location discriminated by the controller via a travel state detection signal detected by a sensor.

The travel route search comprises searching the travel route in such a manner that values added by weight factors provided to each road of travel route are the highest.

If the prior travel route information is not stored, information of a road previously traveled by a mobile object out of roads located from the starting point to the destination is read out. The frequency of travel for each road by the mobile object read out is discriminated, and weight factor is provided to each road in response to the discriminated frequency. A travel route of a mobile object is firstly searched within the roads provided with the weight factors, a map data is used to search remaining travel routes in such a manner that the searched travel route is included.

The travel route search within the roads provided with the weight factors comprises a travel route in such a manner that values added by weight factors provided to each road of travel route can be the highest.

If the prior travel route information is not stored, a controller searches the travel route using at least one of map data, shortest distance search information, highway preference search information and traffic information stored in map data storage.

Discrimination is made as to whether the mobile object has diverted from the searched travel route while guiding in such a manner that the mobile object travels along the searched travel route if the mobile object travels after the travel route is searched.

As a result of the discrimination, if the mobile object has diverted from the searched travel route, information of roads the mobile object has covered is collected until the mobile object returns to the searched travel route from the diverted travel route, and the collected road information is stored in a memory for use in case next travel route is to be searched.

Furthermore, the present invention for searching a travel route using a travel pattern preferred by a user extracts a behavioral factor from a relevant detection location in case a mobile object travels to pass a detection position of the behavioral factor. A weight factor is provided to the behavioral factor and is stored in a memory, and the stored behavioral factor is analyzed to extract a travel pattern preferred by a user. The extracted travel pattern is reflected to search a travel route from a starting point to a destination of the mobile object.

A travel route from the starting point to the destination before the extraction of the behavioral factor is searched. The search of the travel route is to reflect the extracted travel pattern and to search the travel route from the starting point to the destination.

The starting point is a location detected by navigational messages received by a GPS receiver and a current location discriminated by the controller via a travel state detection signal detected by a sensor.

A low weight factor is provided if a mobile object passes a detection location of the behavioral factor along the searched travel route, and a high weight factor is provided if the mobile object diverts from the searched travel route to pass the detection location of the behavioral factor.

The extraction of the preferred travel pattern is implemented when an accumulated quantity of the behavioral factors is equal or greater than a prior set threshold. The extraction of the preferred travel pattern is implemented in such a manner that the behavioral factors stored in the memory are classified per kind, weight factors provided to the behavioral factors per classified kind are added and the preferred travel pattern is extracted by the added weight factors.

The travel route searching method of a mobile object comprises the steps of: sequentially selecting nodes situated between the starting point and the destination of the mobile object; extracting a basic value of a behavioral factor at the selected node and a coefficient of the travel preference relative to the behavioral factor; analyzing a preference at a relevant node by multiplying the basic value of the extracted behavioral factor by the coefficient of the travel preference relative to the behavioral factor; and determining a travel direction of the relevant node according to the analyzed preference.

The travel route searching method of a mobile object further comprises the steps of: discriminating whether the travel preference inputted by the user is stored in the memory if the stored behavioral factor is below the prior set threshold; and searching via the travel preference inputted by the user the travel route from the starting point to the destination if the travel preference inputted by the user is stored as a result of the discrimination.

The travel route searching method of a mobile object comprises the steps of: sequentially selecting nodes situated between the starting point to the destination of the mobile object; extracting a basic value of the behavioral factor at the selected node and a travel preference coefficient relative to the behavioral factor; analyzing a preference at a relevant node by multiplying the basic value of the extracted behavioral factor by the travel preference coefficient relative to the behavioral factor; and determining a travel direction of the relevant node according to the analyzed preference.

If the travel preference inputted by the user is not available, a search is made according to a travel preference previously stored by a manufacturer via the travel route from the starting point to the destination of the mobile object.

The searching of the travel route via the travel preference previously stored by the manufacturer comprises the steps of: sequentially selecting nodes situated between the starting point to the destination of the mobile object; extracting a basic value of a behavioral factor at the selected node and a travel preference coefficient of the behavioral factor inputted by the manufacturer, analyzing a preference at a relevant node by multiplying the basic value of the extracted behavioral factor by the travel preference coefficient of the behavioral factor; and determining a travel direction of the relevant node according to the analyzed preference.

The present invention for reflecting the recommended travel route to search the travel route of the mobile object comprises the steps of storing a road the mobile object travels as a recommended road if the mobile object travels and a storage instruction is inputted; extracting the stored recommended road out of roads situated between the starting point and the destination of the mobile object if a travel route searching instruction is inputted; and searching a travel route from the starting point to the destination in such a manner that the extracted recommended road can be included.

The storage of the recommended road comprises storing an identification (ID) of the road.

The search of the travel route comprises the steps of: determining the recommended road as the travel route; and searching the travel route from the starting point to the destination in such a manner that the determined travel route is included.

The method of searching a travel route of a mobile object using the preference of the user relative to the roads, the travel pattern preferred by the user and the recommended road may be separately used, or may be selectively used according to the selection of the user in one navigation system.

BRIEF DESCRIPTION OF THE DRAWINGS

FIG. 5 is an exemplary drawing of databased travel information according to the present invention.

FIG. 6 is an exemplary drawing of behavioral factors to be databased according to the present invention.

DETAILED DESCRIPTION OF THE INVENTION

Figure 1:
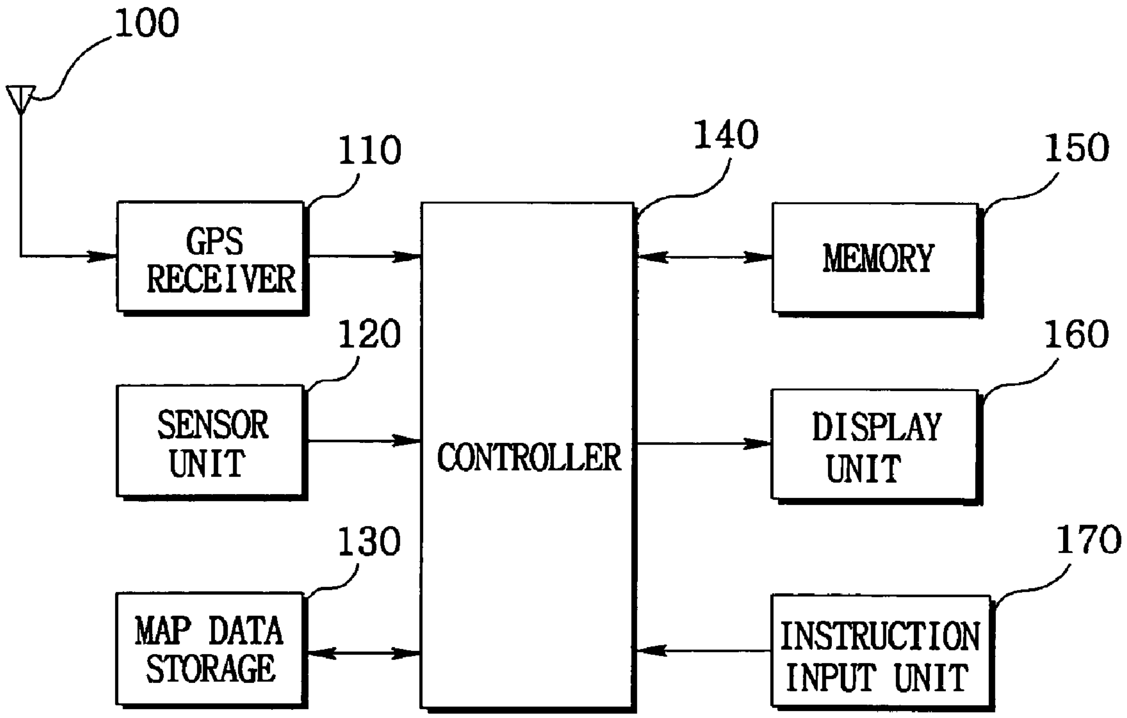
FIG. 1 is a block diagram illustrating a navigation system according to the present invention.

FIG. 1 is a block diagram for illustrating a navigation system according to the present invention, where reference 100 is an antenna, and 110 is a GPS receiver for receiving navigation messages via the antenna (100).

The GPS receiver receives navigation messages periodically transmitted from at least four GPS satellites among the navigation messages transmitted by a plurality of GPS satellites to extract a current position of a mobile object.

Reference numeral 120 which is a sensor unit includes a speed sensor for detecting a travel speed of a mobile object and a sensor such as gyroscope for detecting a travel direction of the mobile object, and these sensors detect the travel state of the mobile object and output a detection signal.

Reference numeral 130 which is map data storage is stored in advance with a map data for searching for a travel route of a mobile object and for guiding the searched travel route.

Reference numeral 140 which is a controller uses a current location of a mobile object detected by the navigation messages received by the GPS receiver (110) and the travel state detection signal of the mobile object outputted by the sensor unit (120) to detect a current location of the mobile object. Furthermore, the controller (140) matches the current location of the mobile object thus detected to the map data stored in the storage (130) and displays the matched current location of the mobile object on a display unit.

Furthermore, the controller (140) refers to the preference of a user, a travel pattern and a route recommended by a third party to search for a travel route from a starting point to a destination and controls an operation of guiding the searched travel route.

Reference numeral 150 which is a memory is stored with an operation data of the controller (140), the preference of the user, the travel pattern and data such as the route recommended by the third party.

Reference numeral 160 which is a display unit displays a current location of a mobile object along with map data in response to the control of the controller (140). Reference numeral 170 which is an instruction input unit is disposed with a plurality of functional keys for generating an operational instruction of a relevant user in response to selective manipulation of the plurality of functional keys and inputting the instruction to the controller (140).

Now, an operation for searching for a travel route using road information preferred by a user will be first described in the searching method according to the present invention applied to the navigation system thus described.

First of all, information of a road preferred by a user is collected if the road information preferred by the user is used to search for a travel route of a mobile object, and the information is databased and stored in the memory (150).

In order to accomplish this, the controller (140) uses a current location of a mobile object discriminated by the navigation messages received by the GPS receiver (110) and a travel state detection signal of the mobile object outputted by the sensor unit (120) to detect the current location of the mobile object when the mobile object moves. Furthermore, the controller (140) uses the current location of the mobile object thus detected to collect the information of roads the mobile object has traveled on and the frequency the mobile object has traveled on the relevant roads, and stores the information and the frequency in the memory (150).

Each collected road is provided with a weight factor in response to the frequency the mobile object has traveled, such that the more frequent a road is traveled, the higher weight factor the road is given.

Figure 2A:
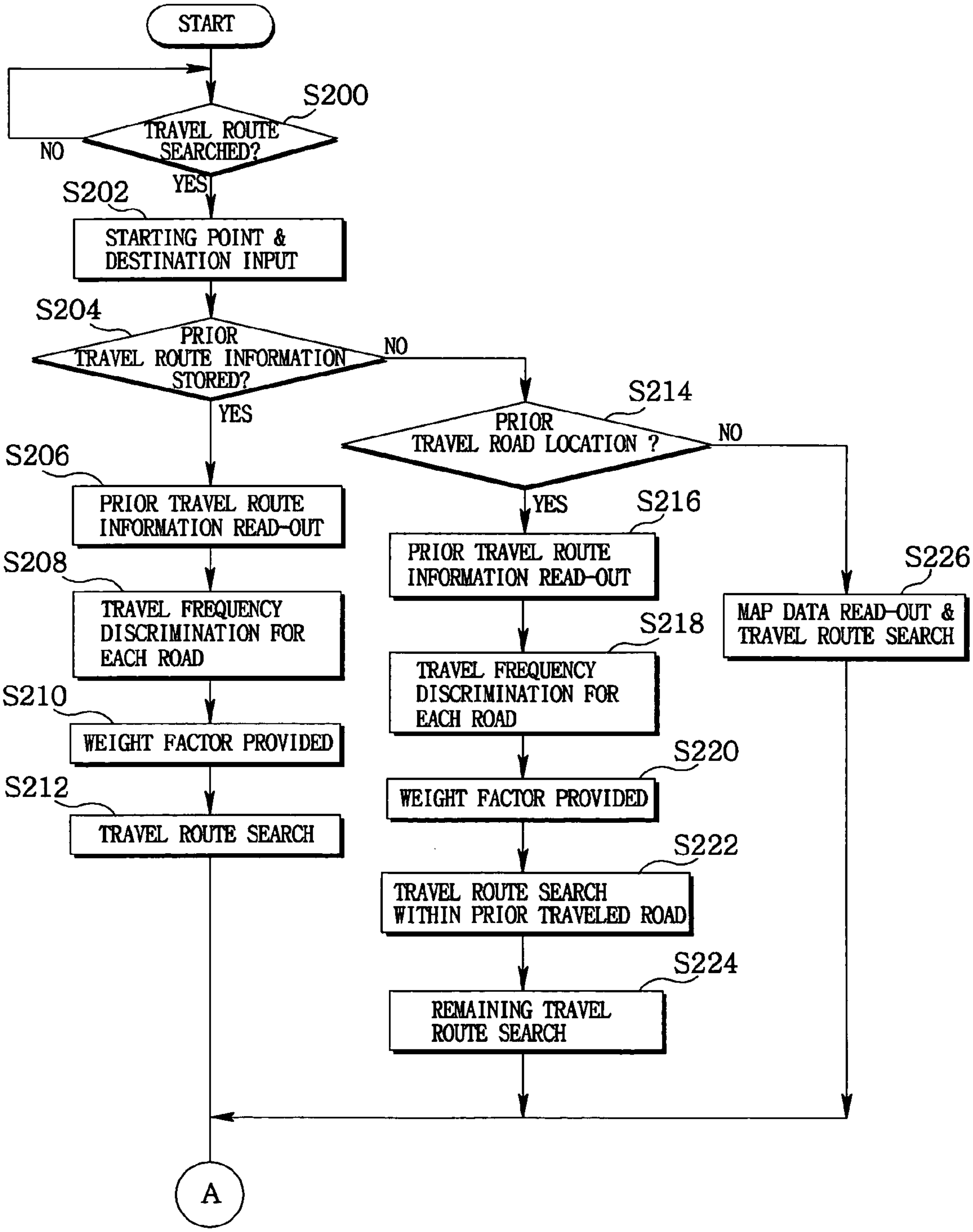
FIGS. 2A and 2B are signal flow charts illustrating an embodiment of a searching method according to the present invention searching for a travel route using preference of a user.
Figure 2B:
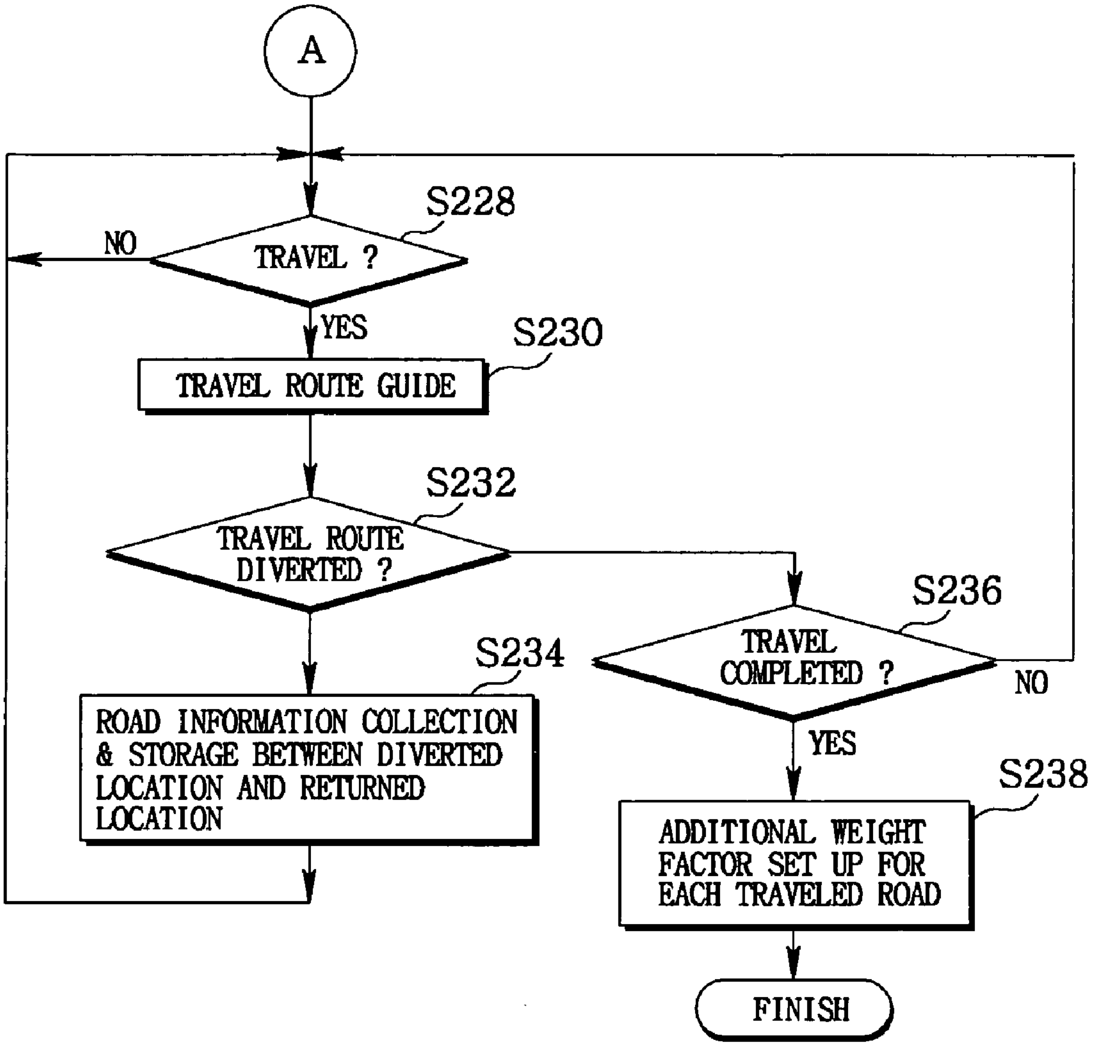

FIGS. 2A and 2B are signal flow charts illustrating an embodiment of a searching method according to the present invention searching for a travel route using preference of a user.

If a user manipulates a functional key of the instruction input unit (170) to instruct a travel route search of a mobile object, the controller (140) discriminates a search of the travel route (S200) and receives a starting point and a destination of the mobile object for searching for the travel route via the instruction input unit (170) (S202). The starting point of the mobile object may be set up as a current location of the mobile object detected by the controller (140) by using the current location of the mobile object detected by the navigation messages received by the GPS receiver (110) and the travel state detection signal of the mobile object outputted by the sensor unit (120).

When the starting point and the destination of the mobile object are inputted, the controller (140) discriminates whether information of the travel route previously covered from the starting point to the destination is stored in the memory (150) (S204).

As a result of the discrimination, if the information of the travel route previously covered is stored in the memory, the controller (140) reads out from the memory (150) all the information of the travel routes previously covered (S206). Discrimination is made on the frequency of the mobile object for each road situated between the starting point and the destination of the mobile object (S208) and a weight factor is provided to each road in response to the discriminated frequency (S210). For example, a weight factor of "1" is provided to a road on which the mobile object has traveled one time, and a weight factor of "5" is provided to a road on which the mobile object has traveled five times. In other words, the more frequent the mobile object has traveled on a road, the higher weight factor the road is provided.

If grant of the weight factor is completed for each road, the controller (140), the controller (140) uses the weight factor provided to each road to search for a travel route from the starting point to the destination (S212). At this time, the travel route is searched by the value in which added weight factors of each road situated between the searched travel routes are the highest Furthermore, as a result of the discrimination at step of S204, if the information of the travel route previously covered by the mobile object is not stored in the memory (150), the controller (140) discriminates whether information of a road previously covered is stored in the memory (150) out of the roads situated between the starting point and the destination (S214). As a result of the discrimination, if the information previously traveled by the mobile object is stored in the memory (150), the controller (140) reads out from the memory (150) the information of the road previously traveled by the mobile object (S216). The controller (140) discriminates the frequency of travel for each road previously covered (S218) and provides a weight factor (S220).

Successively, the controller (140) searches for the travel route in response to the weight factor within the roads previously traveled by the mobile object (S222). The search of the travel route in response to the weight factor is to search for the travel route via the value in which added value of weight factor for each road is the highest.

If the travel route search within the roads previously traveled is completed, a map data in which the searched roads are included is used to search for the remaining travel routes (S224).

If it is discriminated that the information of the roads previously traveled is not stored in the memory (150) as a result of the discrimination at step of S214, the controller (140) uses the map data stored in the storage (130), the shortest distance search information, highway preference information and traffic information to search for a travel route (S226).

Under the circumstance that the travel route of the mobile object is being searched as described above, the controller (140) discriminates whether the mobile object has traveled (S228). If it is discriminated that the mobile object has traveled as a result of the discrimination at step of S228, the controller (140) guides the travel route so that the mobile object can travel along the searched travel route (S230) and discriminates whether the mobile object has diverted from the searched travel route (S232).

As a result of the discrimination if the mobile object has diverted from the searched travel route, the controller (140) collects road information between a location of the travel route from which the mobile object has diverted and a location of the travel route to which the mobile object is to return. The collected road information is stored at the memory (150) by the controller (140) (S234) and is made to be used for a search for next travel route. The flow returns to the step of S228 to continuously guide the travel of the mobile object.

If the mobile object has not diverted from the searched travel route as a result of the discrimination, the controller (140) discriminates whether the mobile object has completed the travel to the destination (S236). If the mobile object has not completed the travel to the destination as a result of the discrimination, the flow returns to step of S228 to continuously guide the travel of the mobile object Furthermore, if the mobile object has completed the travel to the destination, the controller (140) collects the information of the roads covered by the mobile object and stores the information at the memory (150), and amends the weight factor of each road covered by the mobile object and stores the amended weight factor in the memory (150) to finish the flow.

The above embodiment has described a case where a travel route of a mobile object is searched using a relevant travel route only if information of the travel route covered by the mobile object from a starting point to a destination is stored in the memory (150). The present invention is not limited thereto. The travel route of the mobile object may be searched in such a manner that a relevant travel route can be included if a travel route previously covered is available after discrimination is made as to whether the previously covered travel route is available out of travel routes situated between a starting point and a destination of the mobile object.

Next, an operation searching for a travel route will be described using a travel pattern preferred by a user.

First Embodiment

A first embodiment of the present invention for searching for a travel route using a travel pattern preferred by a user is such that the controller (140) inputs a travel route from a starting point to a destination of a mobile object if there is a search instruction of the travel route. The map data storage (160) reads out a map data of a predetermined region and searches for the inputted travel route from a starting point to a destination of the mobile object using the map data thus read out. The controller (140) discriminates a current location of the mobile object via a current location of the mobile object discriminated by the navigation messages received by the GPS receiver (110) and a travel state detection signal of the mobile object detected by the sensor unit (120) when the mobile object travels, and traces the travel route of the mobile object. The controller (140) compares the travel route of the mobile object thus traced with the travel route thus searched, and makes a database of travel information of the mobile object corresponding to the comparison result and stores the information in the memory (150).

Preferably, in making a database of the travel information of the mobile object relative to each crossroad, the controller (140) provides, if possible, a weight factor each to the travel information traveled in accordance with the search result of the travel route covered by a user, and to the travel information covered by the user regardless of the search result of the travel route, the weight factor being different from each other, and the relevant result thereof is stored in the memory (150).

To be more specific, if the mobile object travels, the controller (140) analyzes a user's behavioral factor at a crossroad diverted from the searched travel route and provides a higher weight factor to the behavioral factor of the relevant crossroad. The controller (140) analyzes a travel preference of the traveled normal route along the searched travel route and provides a lower weight factor to the behavioral factor of the relevant crossroad. The behavioral factors of relevant crossroads provided with the weight factors are databased and stored in the memory (150). Preferably, the behavioral factors include one or more out of crossroad information and information on the kinds of roads or the number of lanes in a road.

Now, a process of making a database of, for example, the kinds of roads out of these behavioral factors will be described.

Although a guidance has been given to travel along a highway which is a travel route searched by the controller (140), the user has not traveled along the highway and instead traveled along a shortest cut or a state road of a scenic view, the state road which is a behavioral factor of the kind of road diverted from the searched travel road is given a weight factor. If the user travels along a highway by being guided along the searched travel route except for the state road, the highway which is a behavioral factor of the kind of road is provided with a low weight factor and the weight factor is stored in the memory (150).

Meanwhile, if database is made on the travel routes generated in response to the travels of the mobile object as mentioned above, the controller (140) analyzes the databased travel information and extracts a travel pattern preferred by the user.

The controller (140) compares accumulated quantities of the behavioral factors of the travel information databased and stored in the memory (150) with a prior set threshold. If it is discriminated that the accumulated quantities of the behavioral factors are equal or greater than the threshold as a result of the comparison, it is discriminated that the accumulated quantities of the behavioral factors have a degree of wanted trustworthiness such that it is preferred to extract a travel pattern preferred by the user from the accumulated quantities of the behavioral factors.

The extraction of travel pattern is to sort out an optimum behavioral factor preferred by the user. First of all, the controller (140) loads a basic value pre-set relative to each behavioral factor. A travel preference coefficient relative to each behavioral factor of travel information stored in the memory (150) is calculated. User preference relative to each behavioral factor is analyzed by the loaded basic value and the travel preference coefficient thus calculated to sort out an optimum behavioral factor preferred by the user.

For example, the controller (140) loads the prior set basic value relative to each behavioral factor at a crossroad, and the travel information result stored in the memory (150) is reflected to calculate a travel preference coefficient at the relevant crossroad. Furthermore, the loaded set basic value and the travel preference coefficient thus calculated are operated by a predetermined operation algorithm, and a highest behavioral factor as a result of the operation is sorted out as a behavioral factor at a relevant crossroad preferred by the user. Henceforth, the behavioral factor at the sorted-out relevant crossroad, i.e., a travel pattern preferred by the user at the relevant crossroad, is reflected to search for a travel route of the mobile object, such that a travel route search reflected with the user preference can be carried out.

Thus, according to the present invention, the travel information generated by the travel of the mobile object is databased, and if the databased travel information is discriminated to have a some degree of wanted trustworthiness, the travel information is analyzed to extract a travel pattern preferred by a user at each crossroad, and the travel pattern is reflected on the search for a travel route of a mobile object such that it is possible to search for a route reflected with the user preference.

Second Embodiment

In the second embodiment of the present invention, the controller (140) receives a preference relative to behavioral factor corresponding to a crossroad or the kind of road via the instruction input unit (170) in response to the establishment of a user, and the inputted behavioral factor is reflected to carry out a route search. In other words, in the second embodiment of the present invention, if the user requests a travel route search of a mobile object, the controller (140) reads out the map data from the map data storage (160) to search for a travel route from a starting point to a destination of the mobile object. A preference relative to the predetermined behavioral factor inputted by the user via the instruction input unit (170) is reflected to search for the travel route.

Now, an operation searching for the travel route is described reflecting the preference of the behavioral factor.

The controller (140) loads a basic value for each behavioral factor and provides a higher weight factor to the behavioral factor selected by the user as a preference, i.e., the behavioral factor inputted by the instruction input unit (170). A behavioral factor not preferred by the user is provided with a low weight factor. The set basic value thus loaded and the provided weight factor are used to analyze the user preference for each behavioral factor, and an optimum behavioral factor is sorted out. The sorted out optimum behavioral factor is reflected on a search for a travel route from a starting point to a destination.

For example, the controller (140) loads the prior set basic value for each behavioral factor and a travel preference coefficient is detected for a behavioral factor selected by manipulation by the user of the instruction input unit (170) and for the remaining behavioral factors not selected. The set basic value thus loaded and the travel preference coefficient thus detected are operated by a predetermined operation algorithm, and a behavioral factor having the highest operation value is sorted out as the user preference. The behavioral factor thus sorted out i.e., a travel pattern preferred by the user, is reflected on a travel route from the starting point to the destination of the mobile object and is searched to thereby enable to carry out the search of a travel route reflected with the user preference.

Third Embodiment

In a third embodiment of the present invention, a travel pattern personally set up by the user is followed if the degree of trustworthiness wanted by the travel information of the user is not available at an initial stage. If the degree of trustworthiness wanted by the travel information is available, the travel information thereof is reflected on the route search.

The controller (140) determines whether to reflect the travel pattern preferred by the user on the travel search in response to the accumulated quantities of travel information generated by the travel of the mobile object and stored in the memory (150). In other words, the controller (140) discriminates the accumulated quantities of travel information generated and stored in the memory (150). For example, the prior set threshold and accumulated quantities of behavioral factors are compared as mentioned earlier.

As result of the comparison, if it is discriminated that the accumulated quantities of the behavioral factors are less than the threshold, the travel pattern inputted by the user via the instruction input unit (170) is reflected. If it is discriminated that the accumulated quantities of the behavioral factors are equal or greater than the threshold, the controller (140) analyzes the travel information stored in the memory (150) to extract a travel pattern preferred by the user, and the travel pattern is reflected on the search for the travel route of the mobile object.

The operation of the controller (140) storing the travel information of the mobile object in the memory (150) and databasing the same is identical as that of the first embodiment. In other words, as in the first embodiment, if the mobile object travels, the controller (140) analyzes the travel preference at a diverted route on which the mobile object travels from the searched travel route, and provides a high weight factor to the relevant behavioral factor. The travel preference at a normal route on which the mobile object has traveled along the searched travel route is analyzed, and a low weight factor is provided to the relevant behavioral factor. The behavioral factors provided with the weight factors are stored in the memory (150). Furthermore, at an initial stage where the travel information stored in the memory (150) has no trustworthiness, the travel pattern personally set up by the user is reflected on the route search. If travel information comes to have a wanted degree of trustworthiness, the travel information is reflected on the travel route search.

Figure 3:
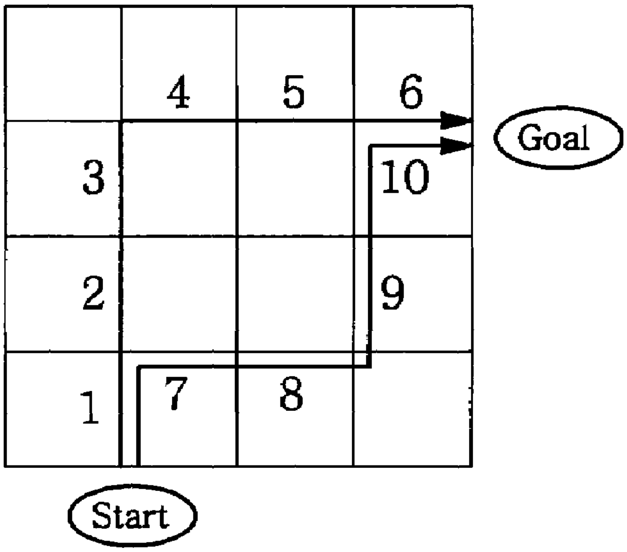
FIG. 3 is a schematic drawing explaining an operation for database of travel information according to the present invention.

Next, an operation of making a database of the travel information according to the present invention will be described with reference to FIG. 3.

In making a database of the travel information according to the present invention, first of all, the controller (140) searches for a travel route from a starting point to a destination of the mobile object. If the mobile object travels, the controller (140) discriminates a current location of the mobile object and traces the travel route. The traced travel route of the mobile object and the searched travel route are compared and the travel information is databased in response to the comparison result Different weight factors are provided in response to the travel information covered by the mobile object along the searched travel route and the diverted travel route covered by the mobile object. For example, as shown in FIG. 2, under a circumstance of the travel route of the mobile object being searched in the order of the starting point (start)-1-7-8-9-10-6-destination (goal), if the mobile object has traveled in the order of starting point (start)-1-2-3-4-5-6-destination (goal), a high weight factor is provided to a GO-STRAIGHT which is a behavioral factor of traveling from 1 to 2. Likewise, a GO-STRAIGHT from 2 to 3, a right turn from 3 to 4, and a GO-STRAIGHT from 4 to 5 are provided with high weight factors. Furthermore, routes at 1 and 6 are included in the searched travel routes such that a GO-STRAIGHT traveling along a route from the starting point to 1, a GO-STRAIGHT traveling along a route from 5 to 6 are provided with low weight factors.

As another example, assuming that the traveling order of 7-8-9-10 on the searched travel route is for highway, and the traveling order of 2-3-4-5 on the searched traveling route is for state road, the state road which is a behavioral factor traveling on a route of 2-3-4-5 is given a high weight factor, while the highway which is a behavioral factor having not traveled on a route of 7-8-9-10 is provided with a low weight factor.

Figure 4:
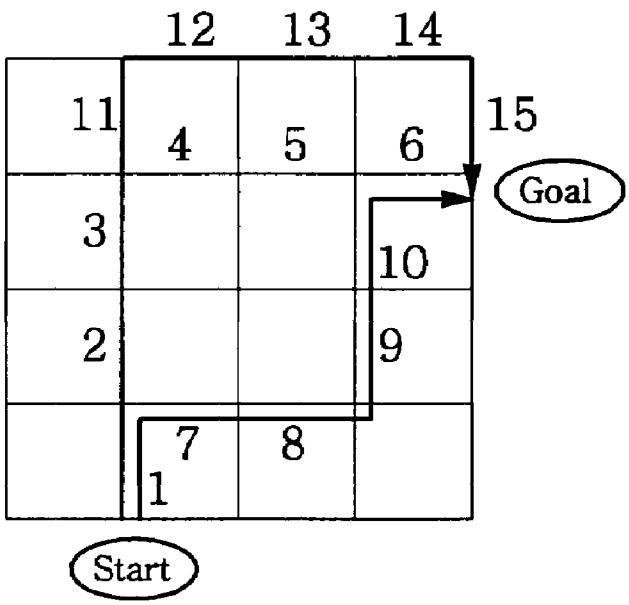
FIG. 4 is a schematic drawing explaining an operation for searching a travel route according to the present invention.

FIG. 4 is a schematic drawing explaining an operation of searching for a travel route of the mobile object with reference to the databased travel information according to the present invention.

If the travel information generated in response to the travel of the mobile object is databased, the databased travel information is analyzed and a travel pattern preferred by the user is extracted, which is reflected on the search for the travel route of the mobile object.

For example, as illustrated in FIG. 4, if a search is made on a travel route from a starting point to a destination of the mobile object without reference to the databased travel information, the travel route is searched in the order of the starting point (start)-1-7-8-9-10-6-destination (goal). However, if it is discriminated as a result of reference to the databased travel information that the user prefers a route of U-turn, the controller (140) first selects a GO-STRAIGHT route at a crossroad to search a travel route in the order of the starting point (start)-1-2-3-11-12-13-14-15-destination (goal).

In the above explanation, the travel route has been searched in consideration of only the behavioral factors preferred by the user. In actual situation, a travel route of a mobile object should be searched reflecting a travel distance of the mobile object, information of the number of lanes on a road along with the behavioral factors preferred by a user. If the behavioral factors of the mobile object preferred by the user and the travel distance of the mobile object are reflected to search the travel route of the mobile object, search is made on a route in the order of the starting point (start)-1-2-3-4-5-6-destination (goal).

FIG. 5 is an exemplary drawing of databased travel information according to the present invention, and FIG. 6 is an exemplary drawing of behavioral factors to be databased according to the present invention.

The databased travel information according to the present invention searches for a travel route of a mobile object, compares the searched travel route with a route on which a user has actually traveled the mobile object, and makes a database of the travel information which is a behavioral factor as a result of the comparison. As depicted in FIG. 4, if the mobile object travels on a crossroad and along a travel route searched by the user, a low weight factor (1) is provided to the relevant behavioral factor. If the mobile object travels on a not-searched route, for example, if a travel route has been searched at a crossroad to the left turn, but the user takes a right turn thereat, a high weight factor (2) is provided to the right-turn behavioral factor. The behavioral factors provided with weight factors are databased and stored in the memory (150). Preferably, as shown in FIG. 6, the behavioral factors include, for example, one or more out of the crossroad information, information on the kinds of roads or the number of lanes. The behavioral factors may take various selections within the scope of the technical ideas of the present invention besides the crossroad information, information on the kinds of roads and the number of the lanes.

Figure 7:
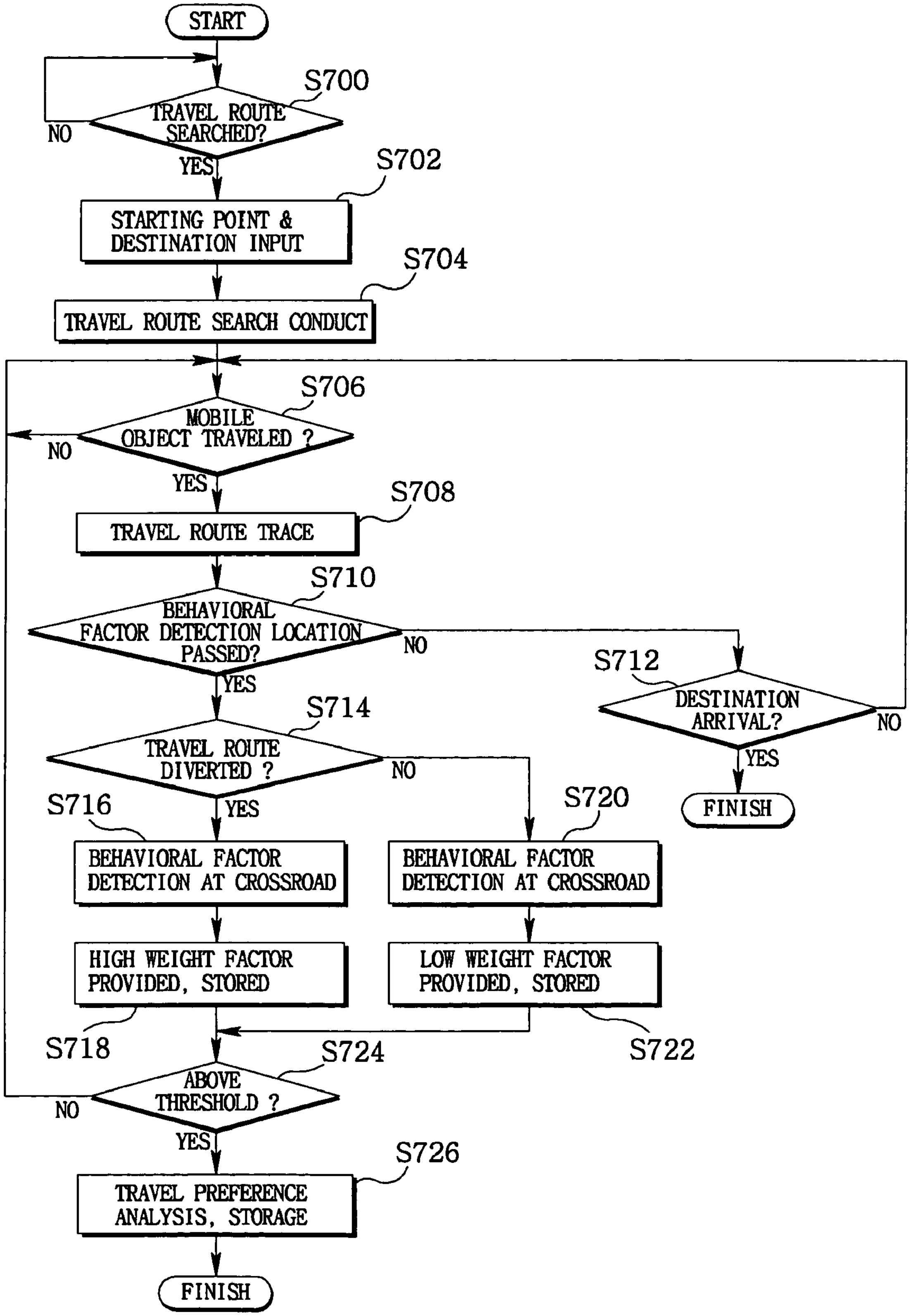
FIG. 7 is a signal flow chart illustrating a process of making a database of travel information according to the present invention.

FIG. 7 is a signal flow chart illustrating a process of making a database of travel information according to the present invention, where S denotes a step.

Referring to FIG. 7, if a user instructs a command to search for a travel route by manipulating the instruction input unit (170) (S700), the controller (140) inputs a starting point and a destination of the mobile object via the instruction input unit (170) (S702). The starting point of the mobile object may be set up as a current location of the mobile object detected by the controller (140) by using a current location of the mobile object detected by the navigation messages received by the GPS receiver (110) and the travel state detection signal of the mobile object outputted by the sensor unit (120)

If the starting point and the destination of the mobile object are inputted, the controller (140) reads out the map data stored in the map data storage (130) to search for the travel route from the starting point to the destination (S704). Under this circumstance, if the mobile object starts to travel (S706), the controller (140) uses the output signals from the GPS receiver (110) and the sensor unit (120) to trace the route on which the mobile object travels (S708), and discriminates whether the mobile object has passed a behavioral factor detection location such as a crossroad, a branch road or the like (S710) and also discriminates whether the mobile object has arrived at the destination (S712).

If the mobile object has arrived at the destination, the flow finishes the operation thereat. If the mobile object has passed the behavioral factor detection location, the controller (140) discriminates whether the mobile object has passed the behavioral factor detection location and diverted from the searched travel route (S714). If it is discriminated that the mobile object has diverted from the searched travel route as a result of the discrimination, the controller (140) detects a behavioral factor of the mobile object at the behavioral factor detection location (S716). For example, the controller discriminates whether the mobile object has advanced straight forward, made a left turn, a right turn or a U turn at the behavioral factor detection location. The controller (140) provides a high weight factor to the discriminated or detected behavioral pattern and stores it at the memory (S718).

As a result of the discrimination, if it is determined that the mobile object has not diverted from the searched travel route, the controller (140) detects a behavioral factor of the mobile object at the behavioral factor detection location (S720), and provides a low weight factor to the detected behavioral pattern and stores it at the memory (S722).

Successively, the controller (140) discriminates whether the number of behavioral factors accumulatively stored at the memory (150) is equal to or greater than the prior set threshold (S724). As a result of the discrimination, if it is determined that the number of the behavioral factors is not above the threshold, the controller (140) returns to S706 and repeats the operations of tracing the route on which the mobile object travels, and discriminating whether the mobile object has passed the behavioral factor detection location and diverted from the searched travel route, and providing a weight factor and storing it in the memory (150).

If it is determined that the number of behavioral factors is above the threshold as a result of the discrimination, the controller (140) uses the behavioral factors stored in the memory (150) and the weight factors provided to the behavioral factors to analyze the travel preference of a user, and stores it in the memory (150) (S726). The travel preference of the user classifies the behavioral factors, for example, per kind, and adds the weight factors provided to each kind of behavioral factors thus classified, and extracts the preferred travel pattern by way of the added values of the weight factors.

FIGS. 8 to 11 are flow charts each illustrating a process of reflecting a preference of a user to search for a travel route according to the preferred embodiment of the present invention.

In the present invention, a travel pattern personally set up by the user is followed if the degree of trustworthiness wanted by the travel information of the user is not available at an initial stage. If the degree of trustworthiness wanted by the travel information is available, the travel information thereof is reflected on the route search.

For that purpose, in the present invention, the controller (140) determines whether to reflect on the search of the travel route of the mobile object the accumulated quantities of the travel information stored in the memory (150) generated by the travel of the mobile object, i.e., the travel pattern of user preference set up by the accumulated amount of the behavioral factors.

Figure 8:
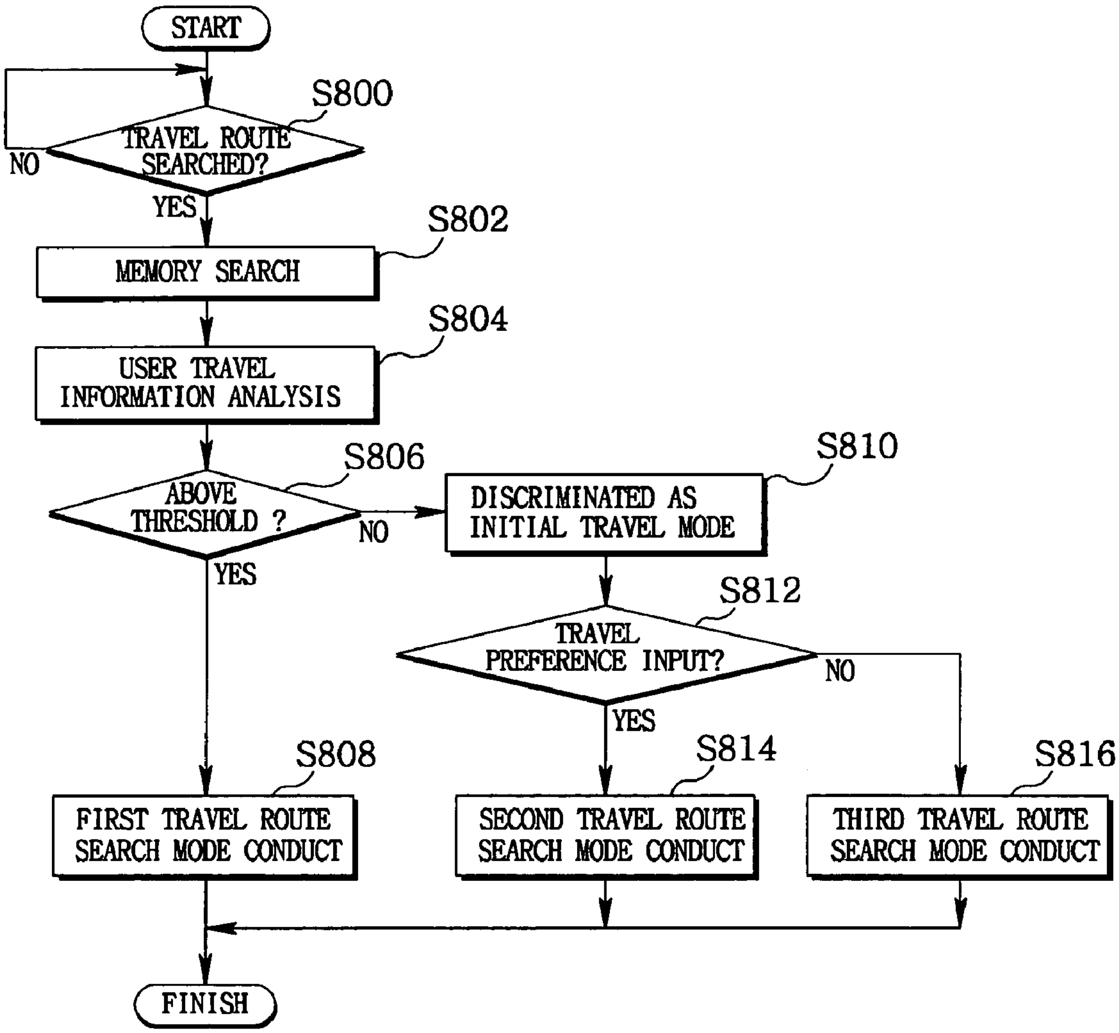
FIGS. 8 to 11 are flow charts each illustrating a process of reflecting a preference of a user to search for a travel route according to the preferred embodiment of the present invention.

Referring to FIG. 8, if the user requests a search for the travel route of the mobile object via the instruction input unit (170), the controller (140) searches for the memory (150) (S802) to analyze the travel information of the user (S804). The controller (140) then discriminates whether the accumulated quantities of the travel information stored in the memory (150), i.e., the accumulated amount of the behavioral factors are equal to or greater than the threshold. (S806).

As a result of the discrimination, if it is determined that the accumulated amount of the behavioral factors is above the threshold, the controller (140) analyzes the travel information stored in the memory (150) to extract a travel pattern preferred by the user, and conducts a first travel route search mode reflected on the search for the travel route (S808).

As a result of the discrimination, if it is determined that the accumulated amount of the behavioral factors is not above the threshold, the controller (140) discriminates it as an initial travel mode (S810), and discriminates whether the user has inputted a travel preference via the instruction input unit (170) (S812). If it is discriminated that the user has inputted the travel preference, the controller (140) executes a second travel route search mode reflecting the travel preference inputted by the user on the search for the travel route (S814). If the travel preference has not been inputted by the user, the controller (140) implements a third travel route search mode reflecting the prior set preference on the search for the travel route (S816).

Figure 9:
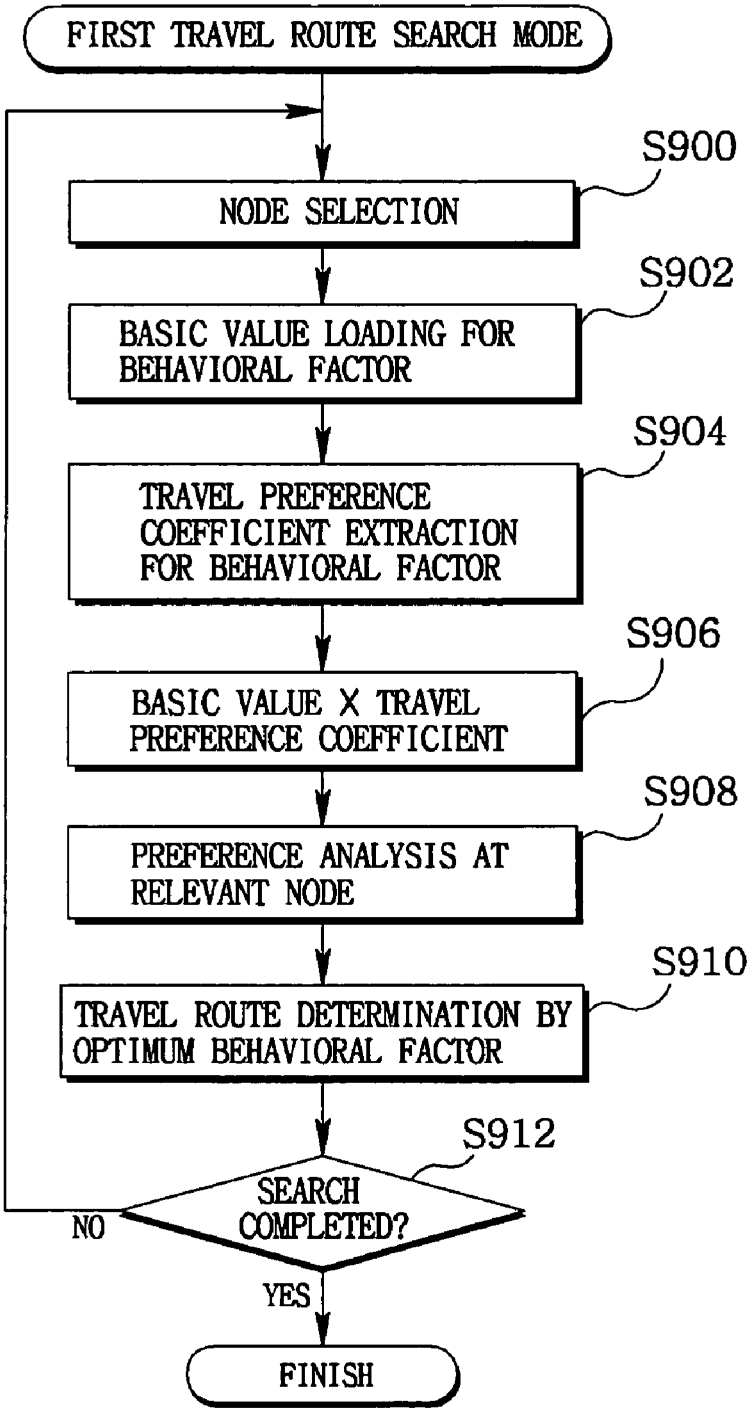

Referring to FIG. 9, the first travel route search mode is such that the controller (140) selects one node, i.e., a crossroad from the starting point of the mobile object (S900). The controller (140) loads a basic value relative to the behavioral factor at the selected crossroad in the memory (150) (S902), and extracts a coefficient of the travel preference relative to the behavioral factor stored in the memory (150) (S904).

Successively, the controller (140) multiplies the basic value relative to the behavioral factor by the travel preference coefficient relative to the behavioral factor (S906), to analyze the preference at the relevant node (S908), and determines a travel route by an optimum behavioral factor (S910). For example, a U-turn which is the optimum behavioral factor at the selected crossroad, a go straight ahead, a left turn, or a right turn direction is determined as the travel route.

Once the travel route at the selected node is determined, the controller (140) discriminates whether a search for the travel route to the destination of the mobile object has been made (S912). If it is determined that the travel route to the destination has not been searched as a result of the discrimination, flow returns to S900 to select next node and repeats the operations of determining the travel route at the selected node. If the search of the travel route to the destination is completed, the controller (140) finishes the travel route searching operation.

Figure 10:
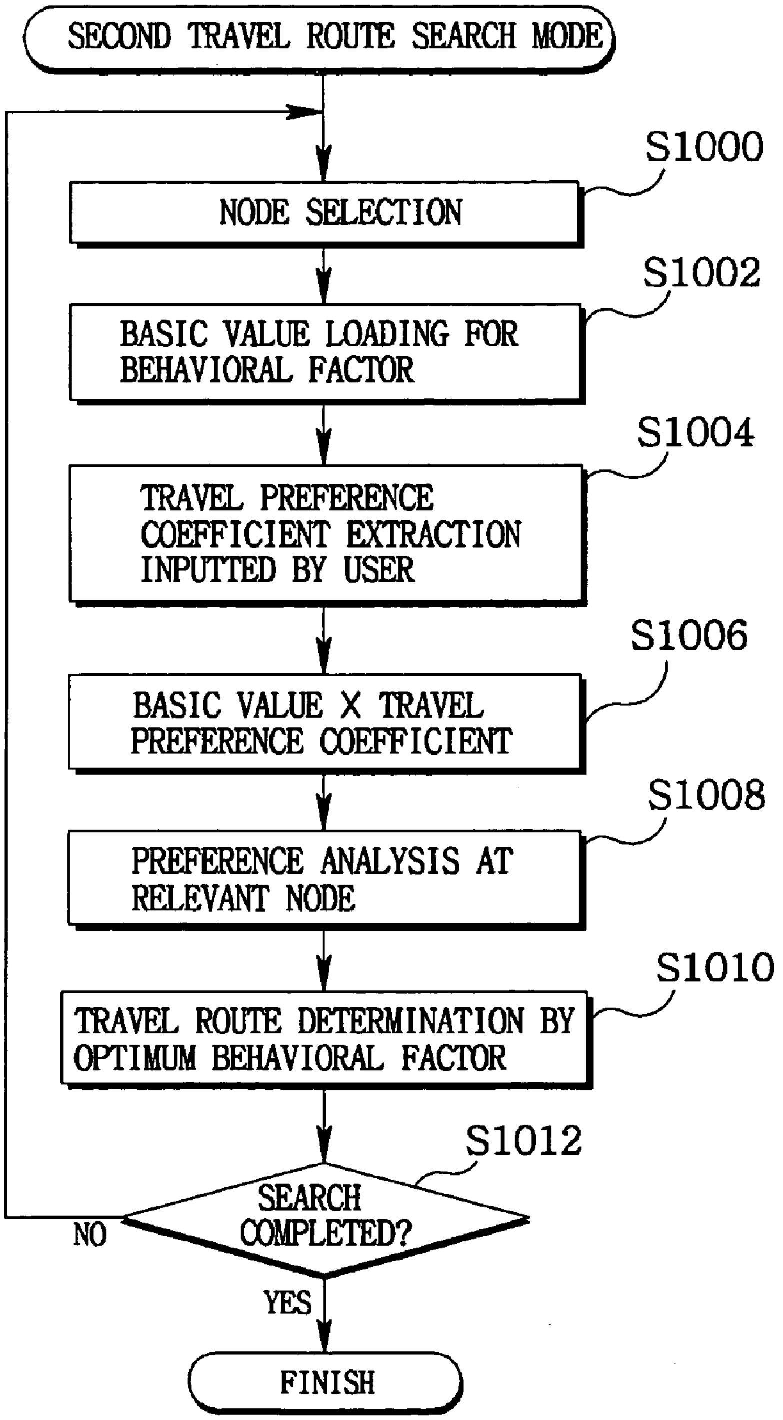

Referring to FIG. 10, the second travel route search mode is such that the controller (140) selects one node from the starting point of the mobile object, i.e., a crossroad (S1000). The controller (140) loads in the memory (150) the basic value relative to the behavioral factor at the selected crossroad (S1102), and extracts a travel preference coefficient relative to the behavioral factor inputted by the user at the memory (150) (S1004).

Successively, the controller (140) multiplies the basic value relative to the behavioral factor by the coefficient of the travel preference relative to the behavioral factor inputted by the user (S1106) to analyze the preference at the relevant node (S1008), and determines a travel route by an optimum behavioral factor (S1010).

Once the travel route at the selected node is determined, the controller (140) discriminates whether a search for the travel route to the destination of the mobile object has been made (S1012). If it is determined that the travel route to the destination has not been searched as a result of the discrimination, flow returns to S1000 to select next node and repeats the operations of determining the travel route at the selected node. If the search of the travel route to the destination is completed, the controller (140) finishes the travel route searching operation.

Figure 11:
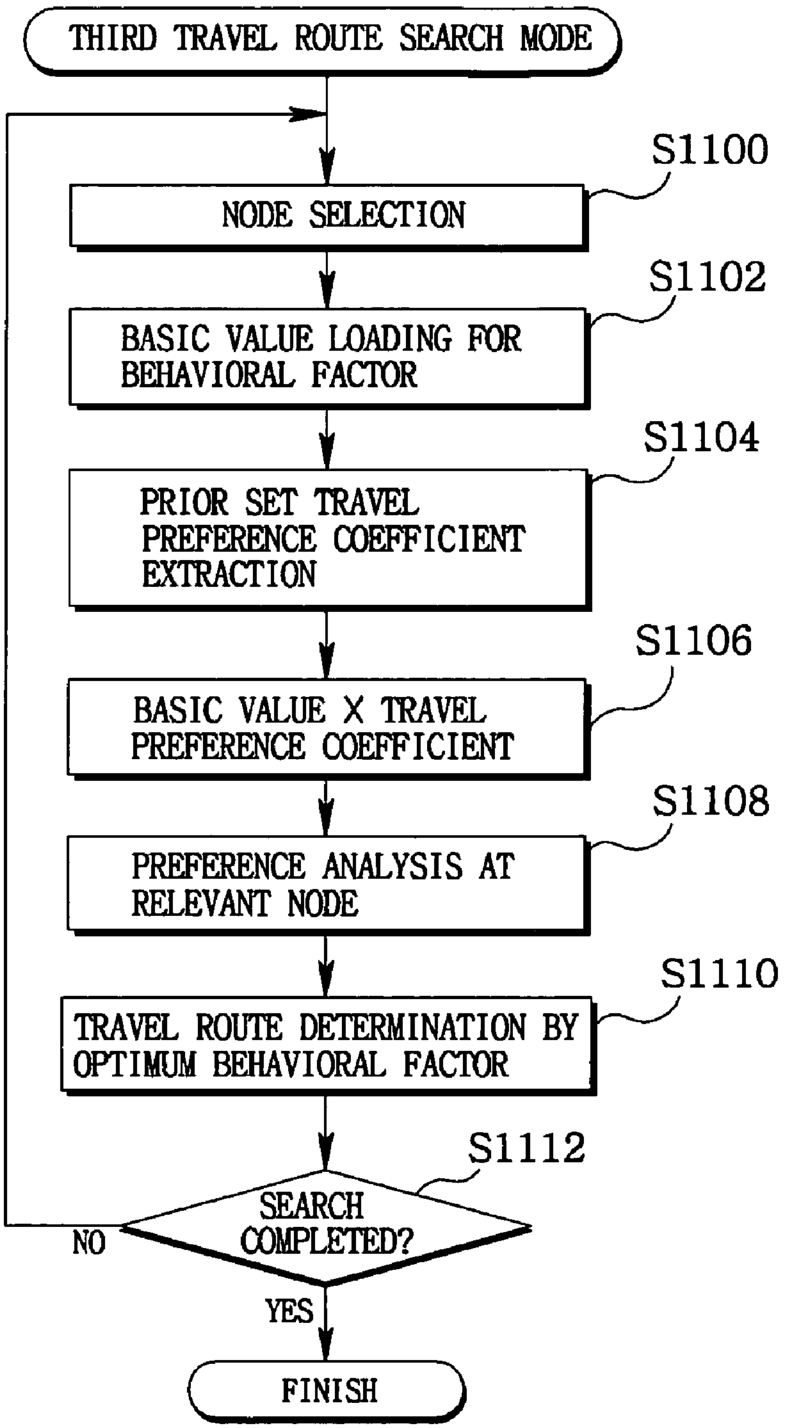

Referring to FIG. 11, the third travel route search mode is such that the controller (140) selects one node from the starting point of the mobile object, i.e., a crossroad (S1100). The controller (140) loads in the memory (150) the basic value relative to the behavioral factor at the selected crossroad (S1102), and extracts a travel preference coefficient relative to the behavioral factor previously inputted by a manufacture of the navigation system at the memory (150) (S1104).

Successively, the controller (140) multiplies the basic value relative to the behavioral factor by the coefficient of the travel preference relative to the previously inputted behavioral factor (S1106) to analyze the preference at the relevant node (S1108), and determines a travel route by an optimum behavioral factor (S1110).

Once the travel route at the selected node is determined, the controller (140) discriminates whether a search for the travel route to the destination of the mobile object has been made (S1112). If it is determined that the travel route to the destination has not been searched as a result of the discrimination, flow returns to S1100 to select next node and repeats the operations of determining the travel route at the selected node. If the search of the travel route to the destination is completed, the controller (140) finishes the travel route searching operation.

Figure 12:
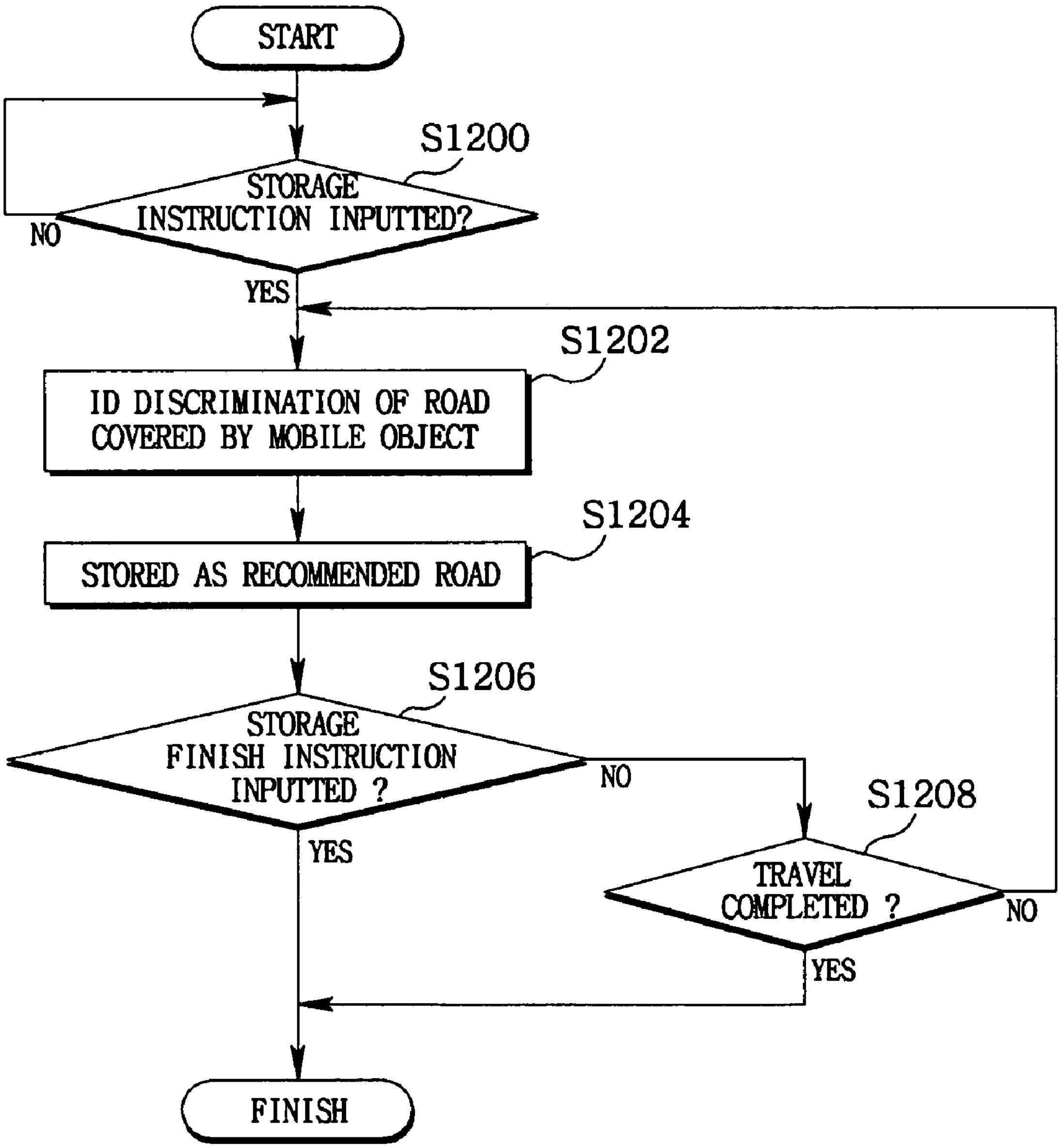
FIG. 12 is a signal flow chart illustrating an operation of storing a recommended route according to the present invention.

FIG. 12 is a signal flow chart illustrating an operation of storing a recommended route according to the present invention. The recommendation of the travel route in the present invention is to recommend a travel route in accordance with the user's own will and to store the recommended travel route.

If an instruction of storing the recommended travel route is inputted via the instruction input unit (170) (S1200), the controller (140) discriminates a current location of the mobile object via the GPS receiver (110) and the output signal of the sensor unit (120), and the discriminated current location of the mobile object is matched to the map data stored in the map data storage (130) to discriminate an identification (ID) of a road on which the mobile object is traveling (S1204). If the ID of the road is discriminated, the controller (140) stores the road of the discriminated ID in the memory (150) as the recommended road.

Successively, the controller (140) discriminates whether a storage finish instruction has been inputted from the instruction input unit (170) (S1206), and discriminates whether the mobile object has completed the travel (S1208).

If it is determined as a result of the discrimination that the storage finish instruction has not been inputted, and the mobile object has not completed the travel, the controller (140) returns to S1202 and repeats the operations of discriminating the ID of the road and storing the recommended road in the memory (150). If it is determined as a result of the discrimination that the storage finish instruction has been inputted and the mobile object has completed the travel, the controller (140) discriminates that the storage of the recommended road has been completed and finishes the operation.

In the case of reflecting the recommended road to search for the travel route of the mobile object, the controller (140) first discriminates whether there is available the recommended road stored in the memory (150) out of roads situated between the starting point and the destination of the mobile object. If there is the recommended road in the memory (150), the controller (140) first sets the recommended road as the travel route. Then, the controller (140) searches for the remaining travel routes so that the mobile object can travel on the recommended road set up as the travel road.

Figure 13:
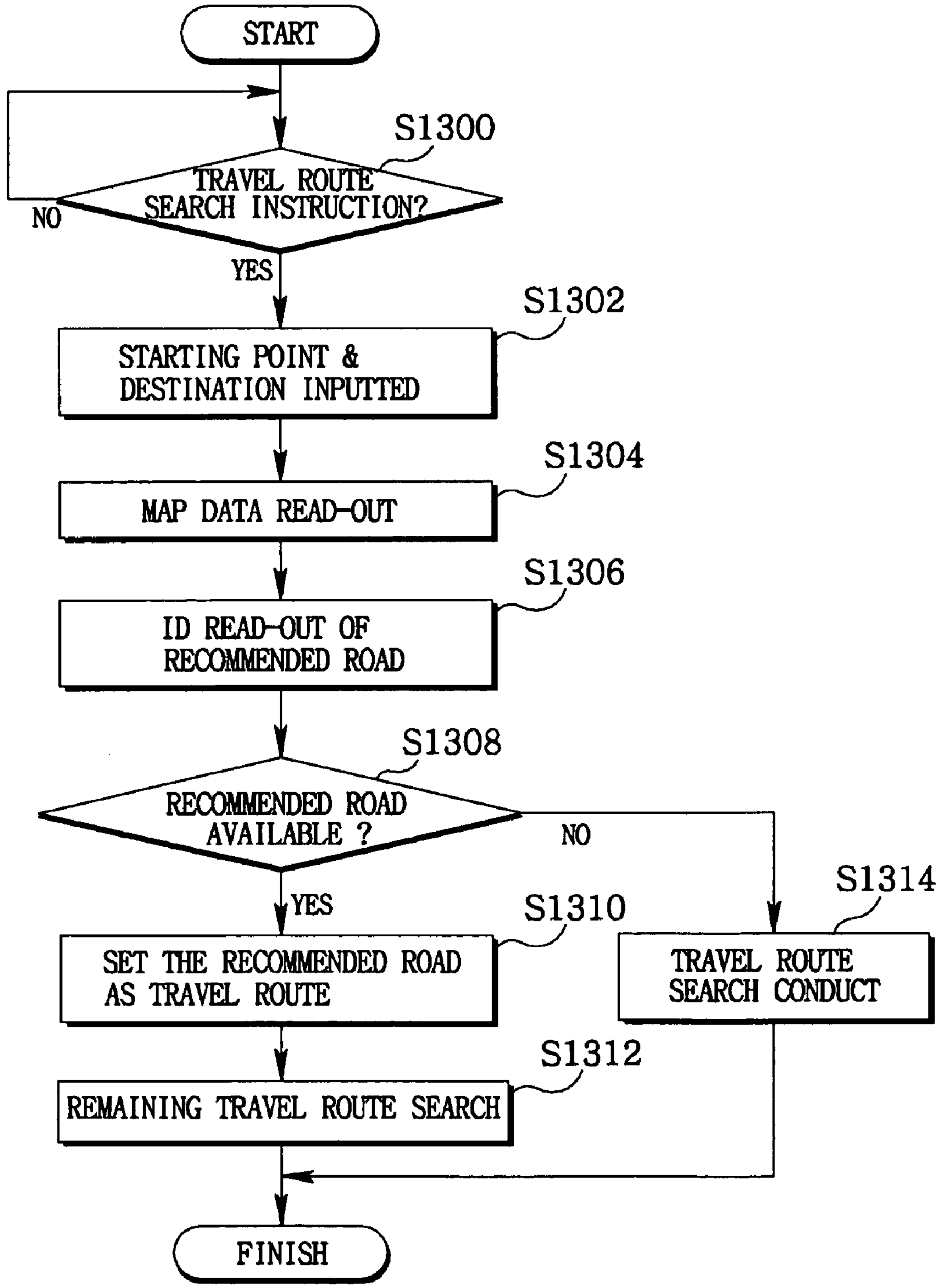
FIG. 13 is a signal flow chart illustrating an operation for searching for a travel route of a mobile object by reflecting the travel route according to the present invention.

FIG. 13 is a signal flow chart illustrating an operation for searching for a travel route of a mobile object by reflecting the travel route according to the present invention.

Referring to FIG. 13, if a travel route search instruction of the mobile object is inputted from the instruction input unit (170) (S1300), the controller (140) inputs a starting point and a destination of the mobile object via the instruction input unit (170) (S1302). The starting point of the mobile object may be set up as a current location of the mobile object detected by the controller (140) by using a current location of the mobile object detected by the navigation messages received by the GPS receiver (110) and the travel state detection signal of the mobile object outputted by the sensor unit (120).

The controller (140) reads out the map data stored in the map data storage (130) (S1304), and reads out the ID of the recommended road from the memory (150) (S1306), and discriminates whether there is available the recommended road between the starting point and the destination of the mobile object (S1308).

If there is no recommended road available as a result of the discrimination, the controller (140) searches for the travel route from the starting point to the destination of the mobile object (S1314) and finishes the operation.

Preferably, the recommended road is shared by a plurality of mobile objects. For that reason, preferably, information of the recommended road stored in the memory (150) is stored in a hand-held storage medium such as USB memory or the like, which is again stored in a memory of other navigation system so that it can be shared.

Furthermore, the travel route search at S1312 and S1314 may be, for example, the search of the travel route of the mobile object by discriminating the user's preference relative to the roads thus mentioned. The travel route search may be the search of the travel route of the mobile object using the travel pattern preferred by the user and collected at the crossroad as above mentioned.

As apparent from the foregoing, if a travel route of a mobile object according to the present invention is to be searched, a weight factor is provided to a road of the travel route on which a user of the mobile object has previously traveled, and the travel route of the mobile object is searched in response to the weight factor thus provided. According to the present invention, a behavioral factor preferred by the user at each crossroad is databased and stored, and the behavioral factor at each crossroad thus stored is used to search the travel route of the mobile object. Furthermore, an ID of a road recommended by a third party who has used the mobile object is stored in a memory, and the travel route is searched around the recommended road in case of searching a travel route.

As a result, there are advantages in the travel route searching method of a mobile object thus described according to the present invention in that an optimum travel route appropriate for a user of a mobile object can be searched and information such as shortest cut, scenic road or the like discriminated by the user while traveling in the mobile object can be shared by all the users of the mobile object, whereby an optimum travel route can be searched.

Although the present invention has been illustrated and described in connection with the preferred embodiments, it will be readily understood by those skilled in the art that various adaptations and changes can be made thereto without departing from the spirit and scope of the present invention defined by the appended claims.

What is claimed is:

1. A travel route searching method of a mobile object, the method comprising:

retrieving route segment data from a route information database wherein the route information comprises information about nodes and segments, wherein a segment is a route between two nodes, wherein route segment data for each segment comprises a starting node, an ending node, a length, a preference factor, and a weight factor responsive to a frequency the segment is used, wherein node data for each node comprises a behavioral factor and a behavioral preference weight factor; and selecting a travel route from a starting point to a destination comprising at least one route segment from the route information database responsive to a sum of the weight factors of the at least one route segment.

2. The method of claim 1, wherein retrieving route segment data occurs after selecting the travel route starting point and destination.

3. The method of claim 2, wherein the travel route starting point is determined by a current GPS location of the mobile object.

4. The method of claim 1, wherein the travel route is selected to maximize the sum of the weight factors of the at least one route segment.

5. The method of claim 1, further comprising:

when more than one travel route has the same sum of the weight factors, selecting the travel route responsive to at least one of a sum of the at least one route segments lengths and the route segment preference factors associated with one or more of the at least one route segments.

6. The method of claim 1 further comprising:

detecting a current location of the mobile object using GPS data;

determining whether the current location of the mobile object follows the at least one route segment of the selected travel route to the selected travel route destination;

when the mobile object follows the at least one route segment of the selected travel route, updating the weight factor of each of the at least one route segment of the selected travel route; and when the mobile object deviates from at least one route segment of the selected travel route, retrieving a deviated route segment from the route information database, and updating the associated weight factor.

7. A travel route searching method of a mobile object, the method comprising:

storing route information in a database when the moving object passes a detection location on a travel route, wherein the route information comprises information about nodes and segments, wherein a segment is a route between two nodes, wherein information for each segment comprises a starting node, an ending node, a length, a preference factor, and a weight factor responsive to a frequency the segment is used, wherein information for each node comprises a behavioral factor and a behavioral preference weight factor, and wherein the detection location is one of the nodes;

analyzing the stored behavioral factors to determine a preferred travel pattern;

selecting a travel route from a starting point to a destination responsive to the preferred travel pattern, wherein selecting the travel route comprises:

sequentially selecting at least one node and at least two segments situated between the starting point and the destination responsive to a sum of a products of the behavioral factor and the behavioral preference weight factor of the at least one node; and determining a travel direction at each of the at least one node according to the behavioral factor of each of the at least one node.

8. The method of claim 7, wherein the travel route starting point and a current location of the mobile object are determined by navigational messages received by a GPS receiver.

9. The method of claim 7, wherein the behavioral preference weight factor is updated with a low weight factor as the mobile object passes each of the at least one node along the selected travel route and with a high weight factor when the mobile object deviates from the selected travel route at each of the at least one node.

10. The method of claim 7, wherein the behavioral factors are classified by type and behavioral preference weight factors are applied to each type of behavioral factor.

11. The method of claim 7, wherein the travel route is selected when the sum of the behavioral factors of the sequentially selected at least one node equals or exceeds a threshold value.

12. The method of claim 11 further comprising:

determining whether a user preferred travel route is stored in the database when the sum of the behavioral preference weight factors of the selected travel route is less than the threshold; and selecting the user preferred travel route if the user preferred travel route is stored.

13. The method of claim 12 further comprising determining the sequential nodes according to a manufacturer's preference when the user preferred travel route is not stored.

14. A travel route searching method of a mobile object, the method comprising:

storing route information in a database, wherein the route information comprises nodes and segments, wherein a segment is a route between two nodes, wherein information for each segment comprises a starting node and an ending node, and wherein information for each node comprises a behavioral factor and a behavioral preference weight factor; and selecting a travel route from a starting point to a destination according to the stored node behavioral preference weight factors, wherein selecting the travel route comprises:

sequentially selecting nodes from the starting point to the destination of the travel route by determining a preferred direction of travel at each node by multiplying each node's behavioral factor and the behavioral preference weight factor.

15. The method of claim 14, wherein a user stores the behavioral preference weight factor for each node.

16. The method of claim 14, wherein a manufacturer of the mobile object stores the behavioral preference weight factor for each node.

17. A travel route searching method of a mobile object, the method comprising:

storing route information in a database, wherein the route information comprises nodes and segments, wherein a segment is a route between two nodes, wherein information for each segment comprises a starting node, an ending node, a length, a preference factor, and a weight factor responsive to a frequency the segment is used, and wherein information for each node comprises a behavioral factor and a behavioral preference weight factor;

retrieving route data from the database; and selecting a travel route having a starting point and a destination, the travel route comprising at least one segment from the database, wherein selecting the travel route comprises determining sequential nodes situated between the starting point and the destination and determining a travel direction at each node according to the behavioral factor and the behavioral preference weight factor of each node.

18. The method of claim 17 further comprising updating the behavioral preference weight factor of each node according to the travel direction at each node of the selected travel route when the mobile object passes each node.

19. The method of claim 18, wherein the behavioral preference weight factor is updated with a low weight factor as the mobile object passes the node along the selected travel route and with a high weight factor when the mobile object deviates from the selected travel route at the node.

20. The method of claim 17, wherein the travel route starting point and a current location of the mobile object are determined by navigational messages received by a GPS receiver.

21. The method of claim 17, wherein the travel route is selected when the sum of the behavioral preference weight factors of the sequential nodes equals or exceeds a threshold value.

22. The method of claim 21 further comprising:

determining whether a user preferred travel route is stored in the database when the sum of the behavioral preference weight factors of the selected travel route is less than the threshold value; and selecting the user preferred travel route if the user preferred travel route is stored.

23. The method of claim 22 further comprising determining the sequential nodes according to a manufacturer's preference when the user preferred travel route is not stored.

24. The method of claim 17, wherein the behavioral factors are classified by type and behavioral preference weight factors are applied to each type of behavioral factors.

25. A travel route searching method of a mobile object, the method comprising:

storing route information in a database, wherein the route information comprises nodes and segments, wherein a segment is a route between two nodes, wherein information for each segment comprises a starting node, an ending node, a length, a preference factor, a weight factor responsive to a frequency the segment is used, and a recommendation indicator, and wherein information for each node comprises a behavioral factor and a behavioral preference weight factor;

retrieving route data from the database; and selecting a travel route having a starting point and a destination, the travel route comprising at least one segment from the database, wherein the recommendation indicator indicates whether the corresponding segment is a recommended segment, and wherein selecting the travel route comprises selecting at least one segment having a recommendation indicator.

26. The method of claim 25, wherein if the travel route cannot be selected having at least one segment having the recommendation indicator, selecting the travel route comprising at least one route segment from the database responsive to a sum of the weight factors of the at least one route segment.

27. The method of claim 26, wherein the travel route starting point and a current location of the mobile object are determined by navigational messages received by a GPS receiver.

28. The method of claim 26, wherein the travel route is selected such that the sum of the weight factors is maximized 29. The method of claim 25, wherein if the travel route cannot be selected having at least one segment having the recommendation indicator, then selecting the travel route comprises selecting at least one segment from the database responsive to at least one of the sum of the selected at least one segment length, the sum of the selected at least one segment preference factor, and traffic information received from a public communications network.

30. The method of claim 25, wherein if the mobile object deviates from the selected travel route, the database is updated to include at least the starting node, the ending node, the length, the preference factor, the weight factor responsive to a frequency the segment is used, and the recommendation indicator for each new segment and the behavioral factor and behavioral preference weight factor for each new node of the deviation from the selected travel route.

31. A mobile object for searching a travel route, the mobile object comprising:

a route information database comprising information about nodes and segments, wherein a segment is a route between two nodes, wherein route segment data for each segment comprises a starting node, an ending node, a length, a preference factor, and a weight factor responsive to a frequency the segment is used, wherein node data for each node comprises a behavioral factor and a behavioral preference weight factor; and a controller operatively coupled to the route information database for selecting a travel route from a starting point to a destination comprising at least one route segment from the route information database responsive to a sum of the weight factors of the at least one route segment.

32. The mobile object of claim 31, wherein the travel route starting point is determined by a current GPS location of the mobile object.

33. The mobile object of claim 31, wherein the travel route is selected to maximize the sum of the night factors of the at least one route segment 34. The mobile object of claim 31, further comprising:

the controller selecting the travel route responsive to at least a sum of the selected route segment lengths or the sum of the selected route segment preference factors when more than one travel route has the same sum of the weight factors.

35. The mobile object of claim 31, wherein the controller detects a current location of the mobile object using GPS data, wherein the controller determines whether the current location of the mobile object follows the at least one route segment of the selected travel route to the selected travel route destination, wherein when the mobile object follows the at least one route segment of the selected travel route, the controller updates the weight factor of each of the at least one route segment of the selected travel route; and wherein when the mobile object deviates from at least one route segment of the selected travel route, the controller retrieves a deviated route segment from the route information database, and updates the associated weight factor.

* * * * *